Oct. 5, 1943.  R. H. CRAMER  2,330,809
GRINDING MACHINE
Filed March 13, 1941  13 Sheets-Sheet 3
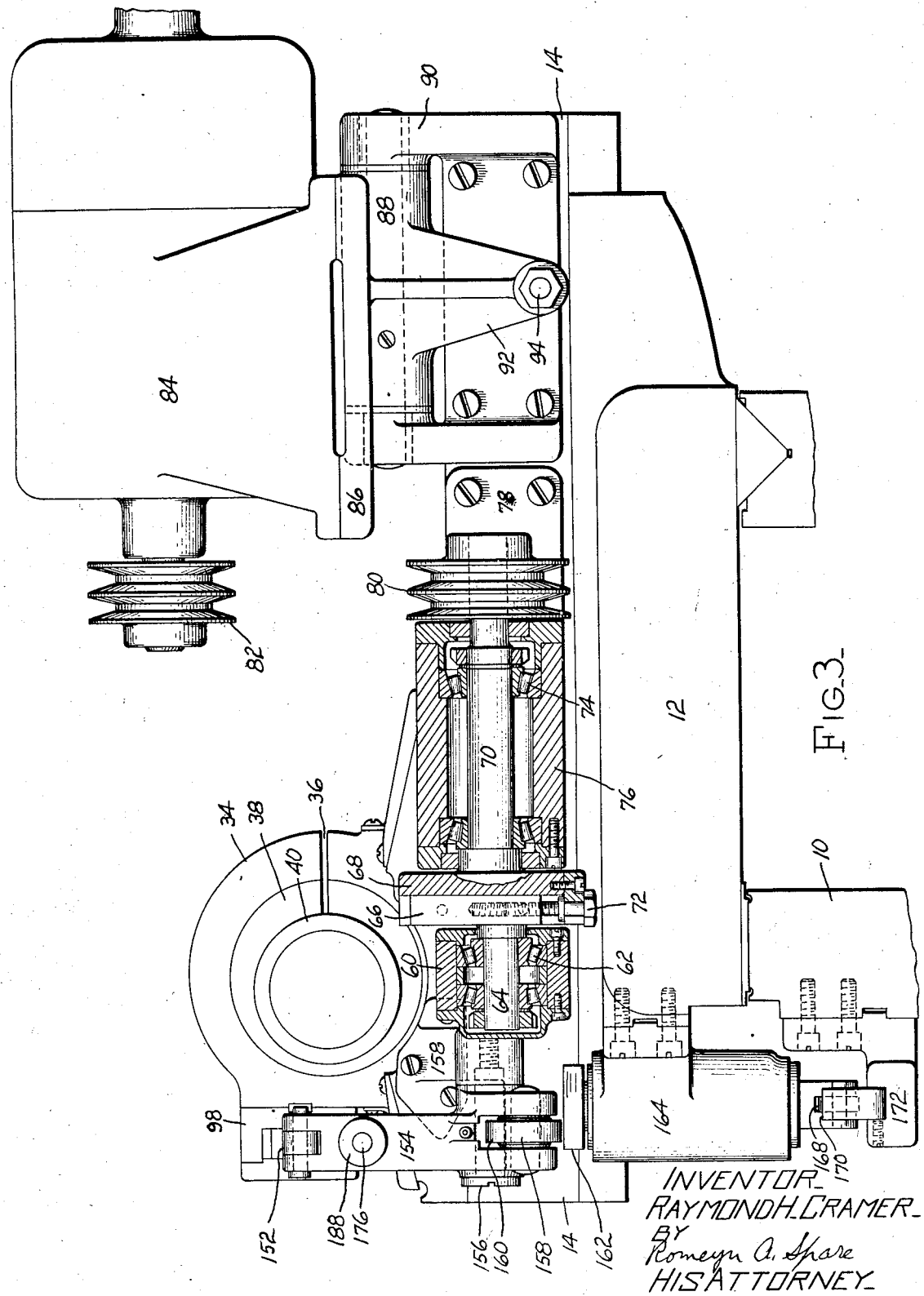
INVENTOR
RAYMOND H. CRAMER
BY
Romeyn A. Spare
HIS ATTORNEY Oct. 5, 1943.   R. H. CRAMER   2,330,809
GRINDING MACHINE
Filed March 13, 1941   13 Sheets-Sheet 4
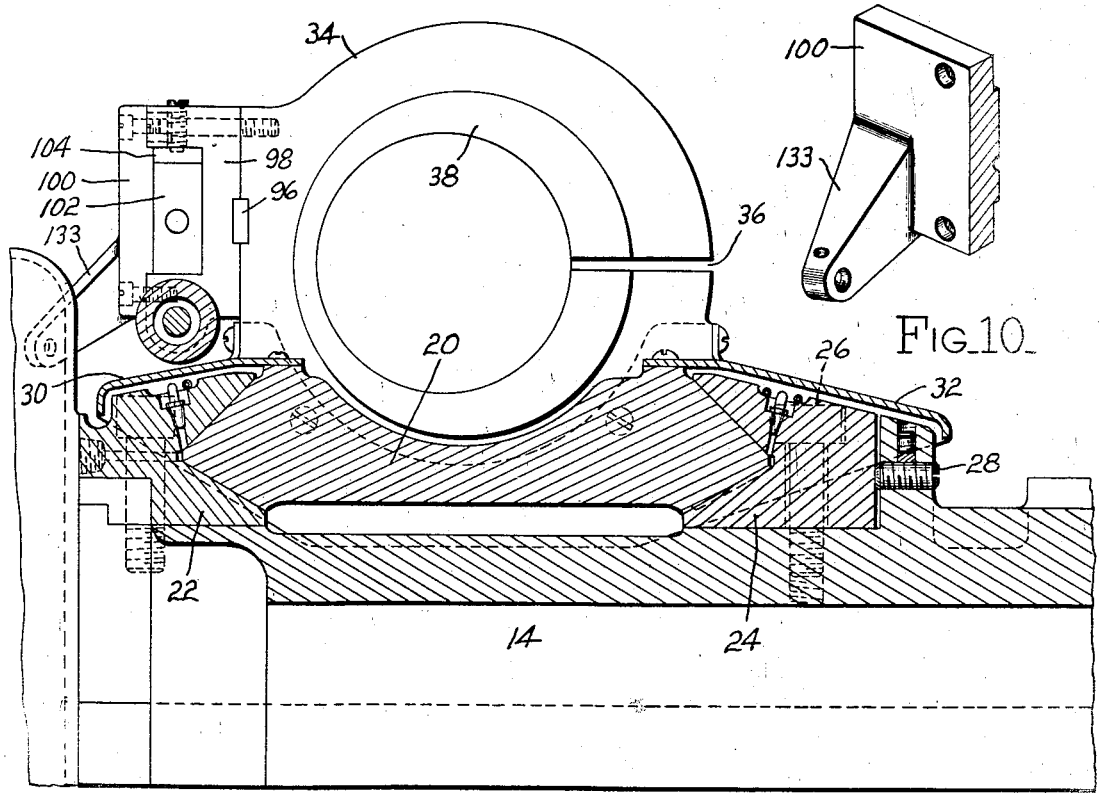
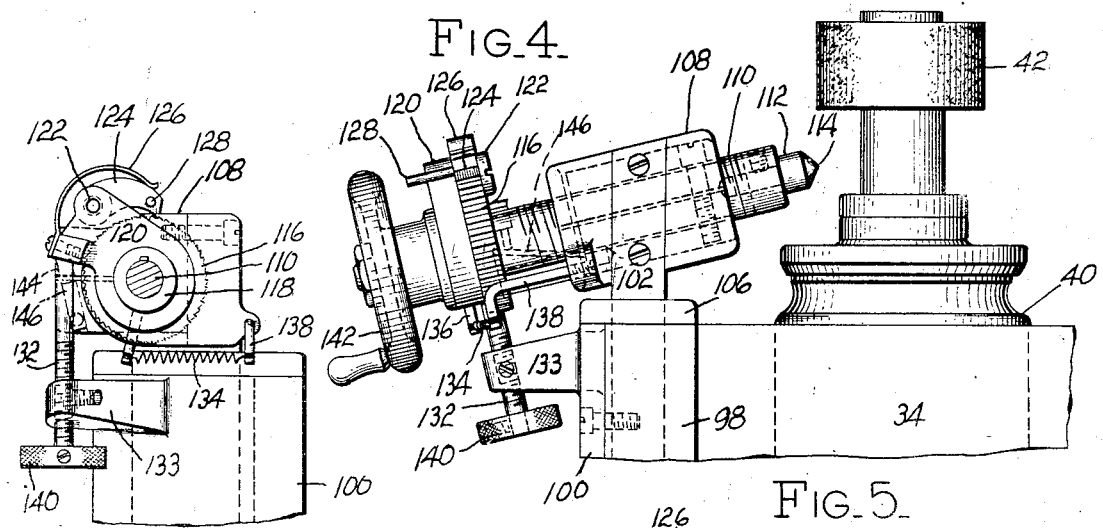
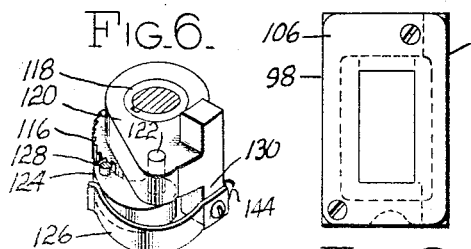 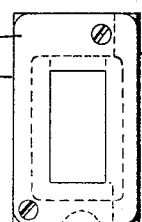 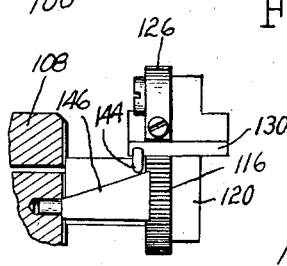
INVENTOR
RAYMOND H. CRAMER
BY
Romeyn A. Spare
HIS ATTORNEY INVENTOR
RAYMOND H. CRAMER
BY
Romeyn A. Spare
HIS ATTORNEY Oct. 5, 1943.   R. H. CRAMER   2,330,809
GRINDING MACHINE
Filed March 13, 1941   13 Sheets-Sheet 6

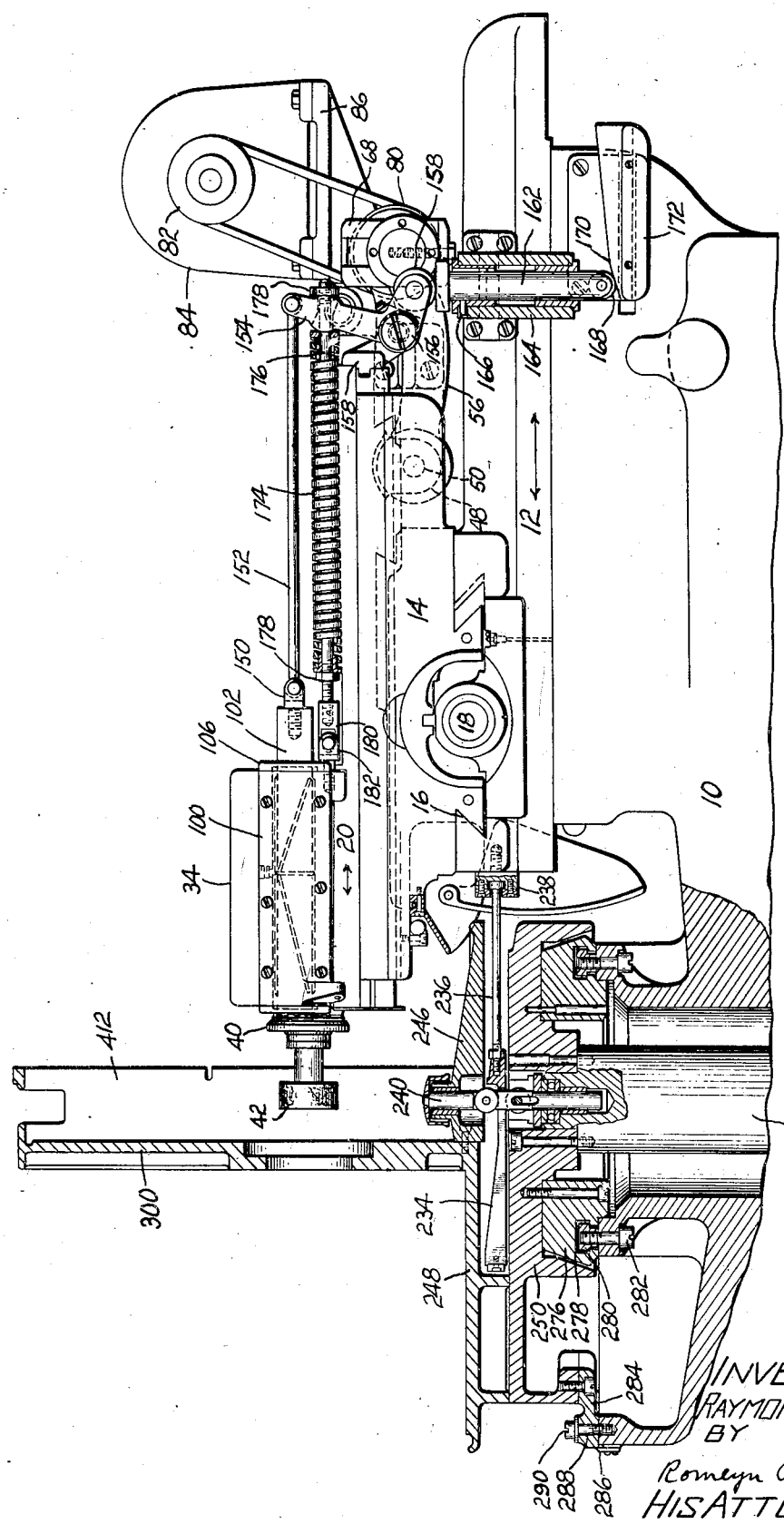

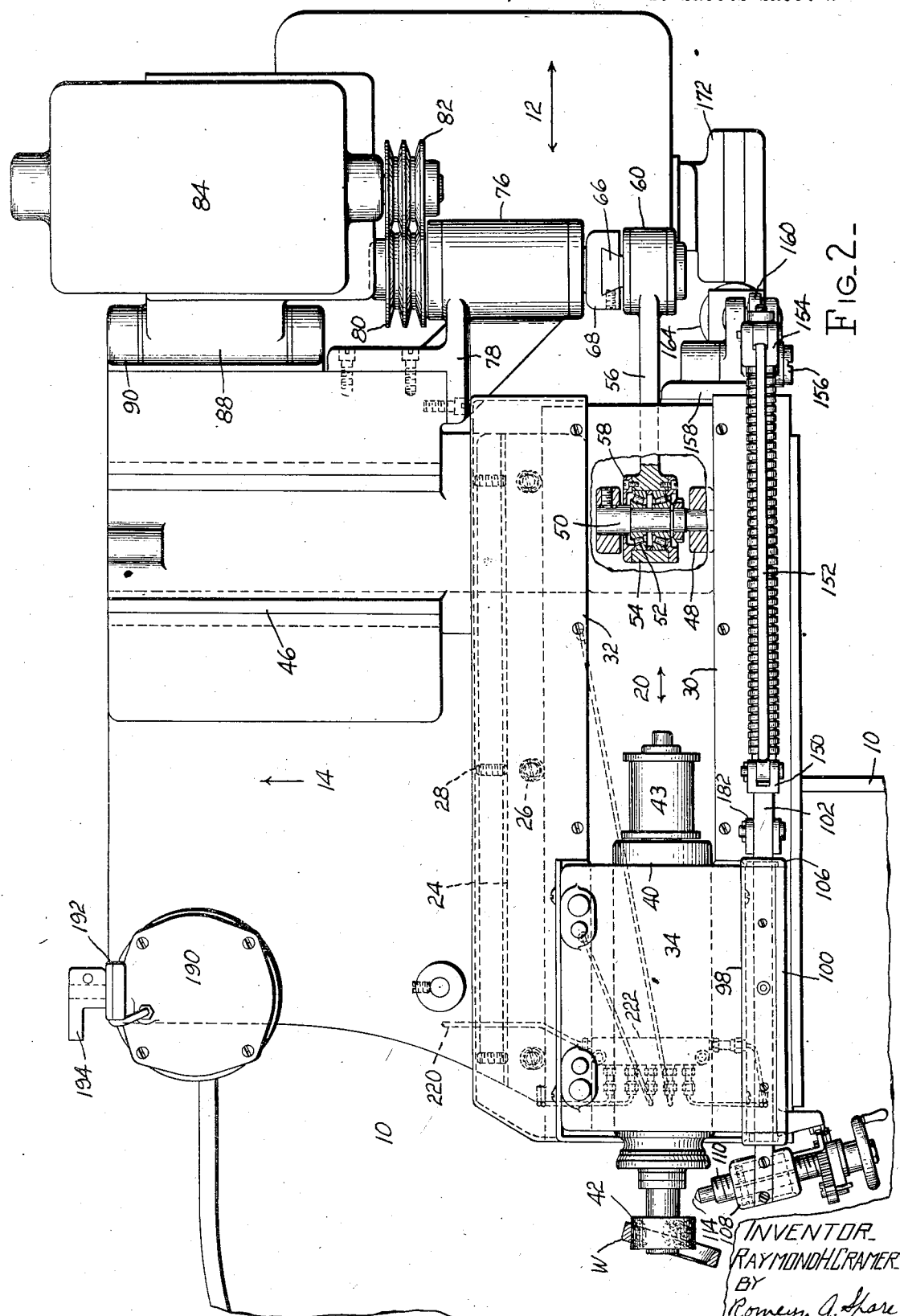

INVENTOR
RAYMOND H. CRAMER
BY
Romeyn A. Spare
HIS ATTORNEY

Oct. 5, 1943.  R. H. CRAMER  2,330,809
GRINDING MACHINE
Filed March 13, 1941  13 Sheets-Sheet 7

INVENTOR
RAYMOND H. CRAMER.
BY
Romeyn A. Spare
HIS ATTORNEY

Oct. 5, 1943.   R. H. CRAMER   2,330,809
GRINDING MACHINE
Filed March 13, 1941   13 Sheets-Sheet 9

Fig_16_

INVENTOR
RAYMOND H. CRAMER
BY
Romeyn A. Spare
HIS ATTORNEY

INVENTOR
RAYMOND H CRAMER
BY
Romeyn A. Spare
HIS ATTORNEY

Oct. 5, 1943.   R. H. CRAMER   2,330,809
GRINDING MACHINE
Filed March 13, 1941   13 Sheets-Sheet 12

INVENTOR
RAYMOND H. CRAMER
BY
Romeyn A. Spare
HIS ATTORNEY.

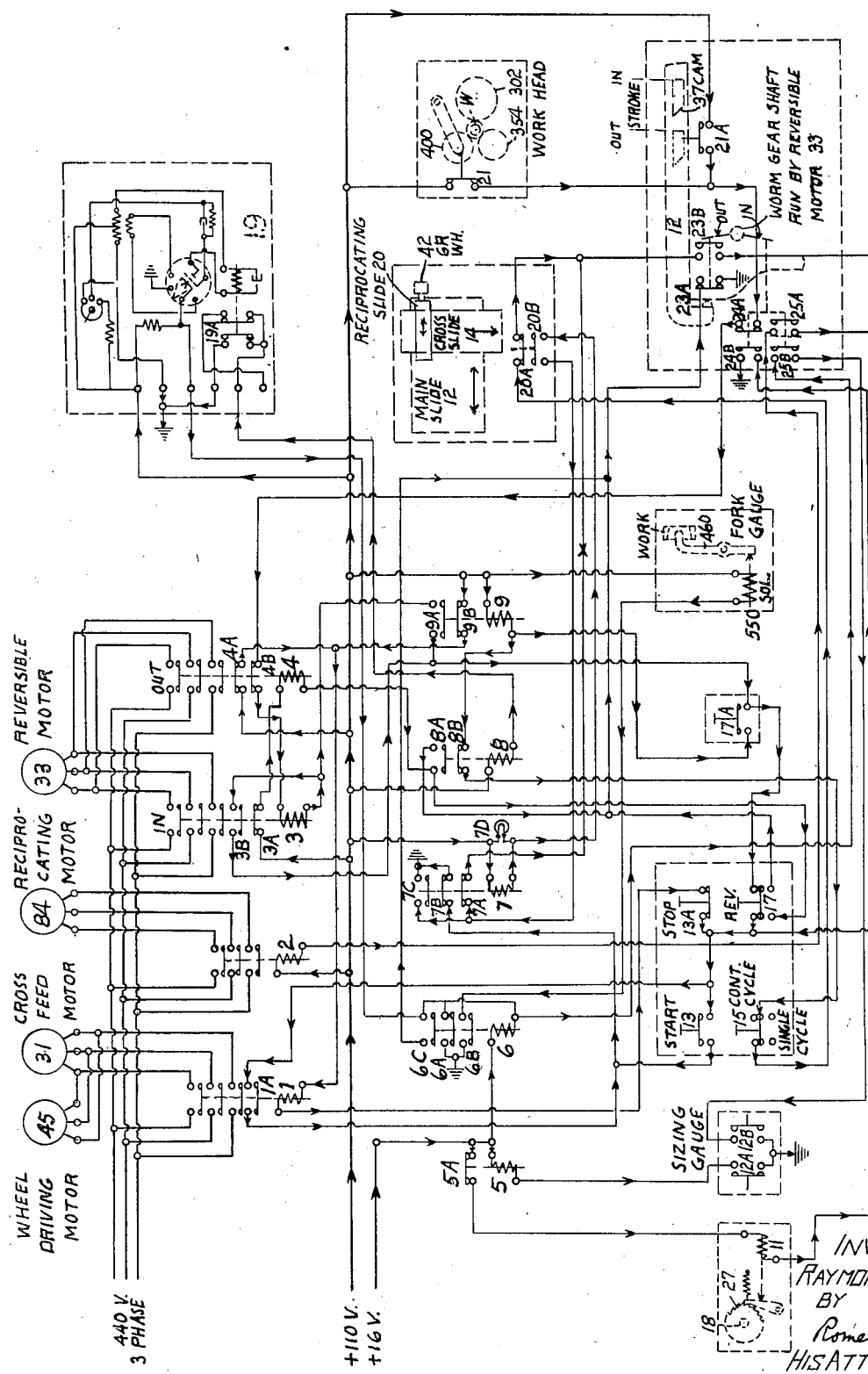

Patented Oct. 5, 1943

2,330,809

UNITED STATES PATENT OFFICE 2,330,809

GRINDING MACHINE

Raymond H. Cramer, Newark, N. J., assignor to General Motors Corporation, Detroit, Mich., a corporation of Delaware Application March 13, 1941, Serial No. 383,200

22 Claims. (Cl. 51—48)

This invention relates to grinding machines and comprises all of the features and aspects of novelty herein disclosed. An object of the invention is to provide an improved machine for grinding interior surfaces or bores. Another object is to provide a grinding machine which is readily convertible so that cylindrical surfaces, tapered surfaces or curved surfaces can be ground. Another object is to provide improved means for mounting and actuating the work head and the grinding wheel. Another object is to provide improved means for controlling work loading and ejecting devices, controlling the size of the work and producing co-ordinated action of the actuating devices for the various movable elements. Still other objects are to provide safety devices to prevent damage if the work is not properly seated and to insure the stopping of the machine when the wheel is worn down to a predetermined limit.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a front elevation with some parts in vertical section and with details of the work head and wheel dresser omitted.

Fig. 2 is a plan view, with some parts in section, of the wheel head and associated slides.

Fig. 3 is a right hand end view of Fig. 1 with some parts in section.

Fig. 4 is a cross sectional view of the two uppermost slides, some of the wheel head appearing in elevation.

Fig. 5 is a plan view of the wheel dressing mechanism.

Fig. 6 is a front view of Fig. 5, the hand wheel being removed.

Fig. 7 is an end view of the compensating mechanism.

Fig. 8 is an end view of the guide for the dresser slide.

Fig. 9 is a perspective view of details of the ratchet mechanism.

Fig. 10 is a perspective view of a portion of the cover for the slideway.

Fig. 24 is a diagram.

Figure 11:
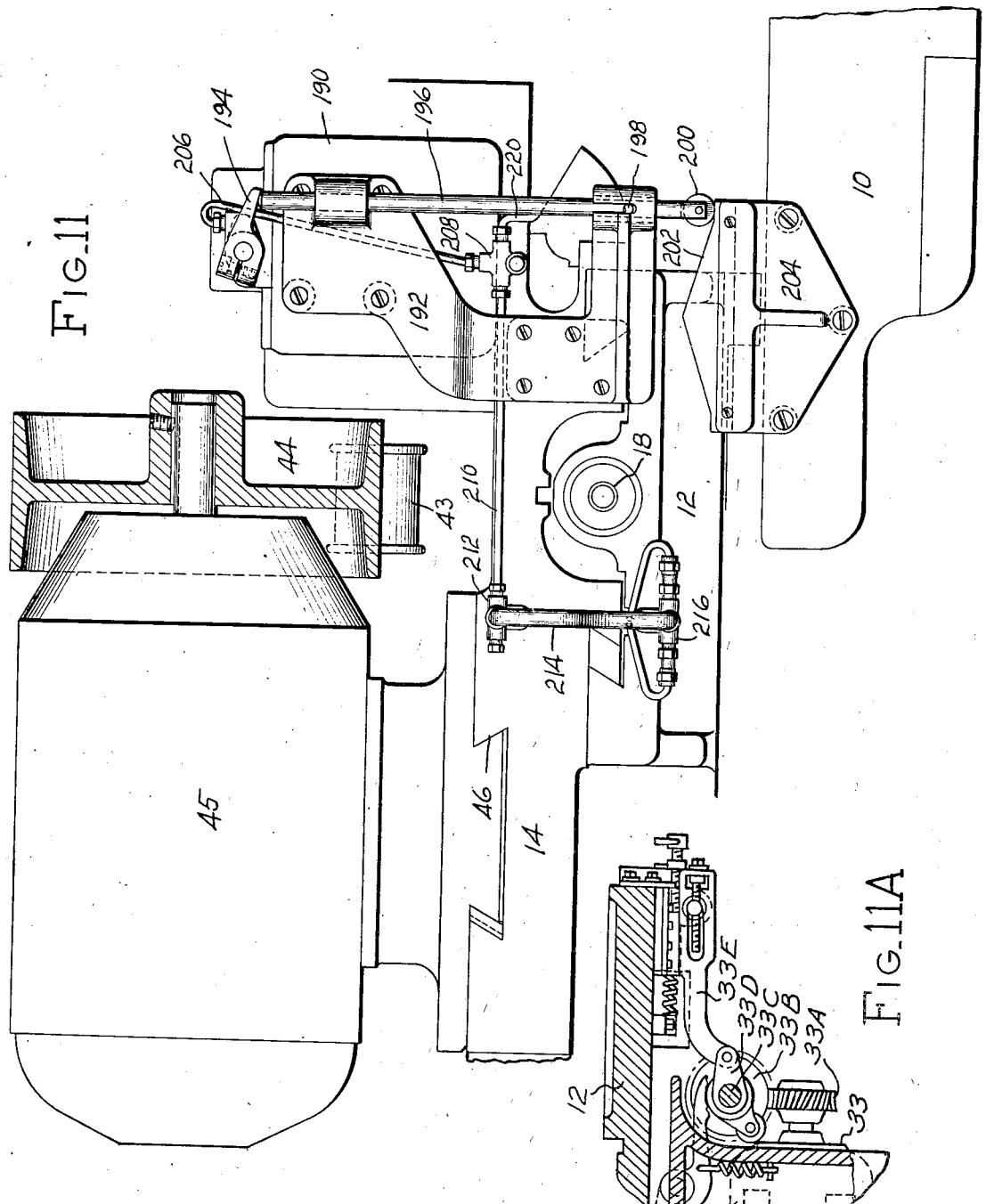
Fig. 11 is a rear elevation of the lubricating mechanism.

Referring to Figs. 1, 2 and 3, the machine comprises a main frame 10 on which is slidably mounted a lower or main slide 12 which is given one reciprocation at each cycle of grinding substantially as in Van Norman Patent 2,149,409. The left end of the machine may carry an oscillating head when grinding curved work or, by means of an adapter, the head can be fixed in an angularly adjusted position so that tapered work or straight cylindrical work may be ground. The machine will be described with special reference to the grinding of tapered raceways. At the right end of the frame there are flat and V-ways to support corresponding ways on the main or lower slide 12 which is advanced or retracted by a reversible motor, the slide being advanced to get the grinding wheel inside the work and the slide being retracted at the end of the grinding operation.

A cross slide 14 sliding on ways 16 is adapted to be fed by a feed screw 18 which is actuated by ratchet mechanism similar to that of the patent. The cross slide has ways near its front to support an upper or grinding wheel slide 20 which is narrow and light and continuously reciprocated through a short stroke, the head also supporting dressing mechanism which also normally partakes of the reciprocating movement. As appears best in Fig. 4, to guide the slide 20, a front slideway or guide bar 22 is fastened to the cross slide 14 by bolts while a rear slideway or gib 24 is adjustably secured to the cross slide by bolts 26 passing through slots in the gib. The ways are V-shaped and a take-up is provided by screws 28 threaded in a lug on the cross slide and locked by a brass shoe which is backed up by a set screw. Oil conduits to conduct oil to the ways are provided and the ways are covered at the front by a dust shield 30 having an end flange which covers the end of the slideway. A similar dust shield 32 covers the rear slideway. The upper slide 20 has at one end an upright portion or head 34 which is split at 36 and adapted to clamp a split eccentric bushing 38 in which the grinding spindle quill 40 is mounted, the bushing 38 being removable to permit the mounting in the head of a larger size quill. The grinding wheel 42 has its spindle mounted for rotation in this quill and it is driven by a pulley 43 and a belt from a pulley 44 (Fig. 11) on a motor 45 adjustably mounted upon ways 46 on the top, rear portion of the cross slide 14.

Referring particularly to Figs. 1, 2 and 3, the mechanism for giving continuous reciprocation to the upper slide 20 comprises a pair of lugs 48 projecting downwardly from the slide through a slot in the cross slide 14, the lugs supporting a pivot pin 50 on which are mounted a pair of tapered roller bearings 52 whose outer race rings are separated by a spacer. The inner race rings of the bearing are held on the pin 50 by a nut. The outer race rings are contained in an enlargement 54 of a link 56, the bearings being covered by cover plates 58. The other end of the link also has a similar enlargement 60 closed by cover plates as indicated best in Fig. 3. In the enlargement are similar tapered bearings 62 whose inner race rings are clamped upon a crank pin 64 projecting from a slide 66 adapted for movement of adjustment in ways formed across an enlargement 68 of a driven shaft 70. The slide 66 is adjustable to vary the throw of the crank pin 64 by means of an adjusting screw 72 threaded therein and held from endwise movement by a plate attached to the enlargement 68.

The shaft 70 is journalled for rotation in tapered roller bearings 74 contained in a housing 76 on a bracket 78 which is bolted to the cross slide 14. The bearings are covered by suitable caps containing seals. The shaft 70 is driven by a pulley 80 connected by a belt to a pulley 82 on an electric motor 84 which is fastened on a pivoted supporting plate 86. The plate has a boss 88 with a hinge pin which projects into rubber bushings carried by lugs 90 upon an upright bracket which is bolted on the cross slide 14 near the rear. The boss 88 has a downwardly extending arm 92 provided with an abutment screw 94 which is adjustable to vary the position of the motor and tighten the belt.

Referring particularly to Fig. 4, the upright portion of the upper slide 20 has a key 96 to locate a guide or housing which is bolted on the upright part and has a cover 100 to form a rectangular guide for a slide 102 which pertains to the dressing of the grinding wheel. A gib plate 104 bears against the upper side of the slide and is backed up by cap screws. Where the slide projects through the ends of the housing, tight joints are formed by caps 106 having rectangular openings and provided with packings.

As shown best in Fig. 5, one end of the slide 102 is fastened by screws in a groove extending at an angle across the top of a bracket or nut 108 which is slit underneath and internally threaded to receive a feed screw 110 having a nib 112 which carries a dressing diamond 114 at the end. A ratchet wheel 116 is keyed to a reduced portion of the feed screw 110 and has a projecting hub 118 on which a pawl supporting arm 120 is loosely mounted for pivotal movement. The arm has a pivot stud 122 to pivotally mount a pawl 124 which is urged towards the ratchet wheel by a leaf spring 126. The pawl has a lifting pin 128 projecting laterally over the arm 120. The arm has extensions 130 adapted to abut, in various positions of advance, against a stop screw 132 adjustably fastened to a lug 133 on the cover 100, the arm being urged towards the stop screw by a coil spring 134 connected to a pin 136 on the arm 120 and to the bent end of an anchor pin 138 fastened to the bracket or nut 108. The screw 132 can be manually turned for adjustment by a knurled head 140 but the cross feed of the diamond is automatic and occurs whenever the slide 102 is retracted.

When the main slide 12 retreats, as at the end of a cycle, the slide 102 and the dressing mechanism are advanced, as will appear, carrying the pawl supporting arm 120 away from the stop screw 132, thereby allowing the coil spring 134 to swing the arm until a contact pin 144 on the extension 130 of the arm abuts against a tapered cam or stop plate 146 projecting from the bracket 108. Thus, during advance of the slide 102 and the ratchet mechanism, the pawl is drawn back to get a new grip on the ratchet wheel and, when the slide is subsequently retracted, the pawl supporting arm 120 engages the stop screw 132 and causes the pawl to feed the ratchet wheel and the feed screw and diamond. The amount of feed can be adjusted by screwing the stop screw 132 more or less into the lug 133 and clamping it with a screw. The tapered cam or stop plate 146 and the pin 144 provide means to automatically increase the advance of the diamond to compensate for increasing wear on the wheel as the latter decreases in diameter, it being evident that the feed screw 110 intermittently moves the ratchet mechanism towards the wheel and so advances the pin 144 along the tapered cam plate 146.

The following mechanism (best shown in Fig. 1) causes the advance of the slide 102 at the end of each grinding cycle. A clevis 150, fastened to the rear end of the slide 102, is pivotally connected to one end of an actuating rod or link 152, the other end of the actuating rod being pivotally connected to the upper end of an actuating lever 154 which is in the form of a bell crank. The lever is pivotally mounted on a headed pivot stud 156 threaded in a lug upon a bracket 158 which is fastened to the upper slide 20. The short arm of the bell crank carries a roller 158 adapted to ride along the enlarged rectangular head of a plunger 162 which is vertically slidable in bushings in a housing 164 which is fastened on the main or lower slide 12.

The upper bushing is held from rotation by a dowel pin 166 projecting into a slot of the housing 164 and the plunger is held from rotation in the bushing by a key pin projecting into a keyway. The lower end of the plunger carries a cam roll 168 adapted to ride on an inclined cam 170 fastened in a groove of a cam bracket 172 which is fastened on the main frame. When the main slide is retracted to withdraw the grinding wheel from the work, the roller runs up the cam, lifting the plunger 162 and rocking the bell crank lever 154 to traverse the diamond along the grinding wheel.

When the main slide advances again, the plunger is compelled to descend by the action of a long coil spring 174 interposed between a pair of flanged abutment sleeves on a rod 176. One abutment sleeve engages a nut 178 threaded on the rod and the other engages a rounded surface on the lever 154, the rod 176 passing through a diverging slot in the lever and having a stop nut 178 fastened thereon and engaging a rounded surface on the other side of the lever. The rod 176 is threaded in a sleeve 180 which is flat at the sides to fit between ears on a forked stud 182 fastened to the housing 98 and having a pivot pin for the sleeve 180. The coil spring 174 will react upon the lever 154 and urge slide 102 towards retracted position with the pawl carrying arm 120 against the stop screw 132. This occurs whenever the main slide advances and results in moving the diamond back across the wheel and giving the diamond a feed movement to compensate for wear and reduction in diameter of the wheel.

Figure 12:
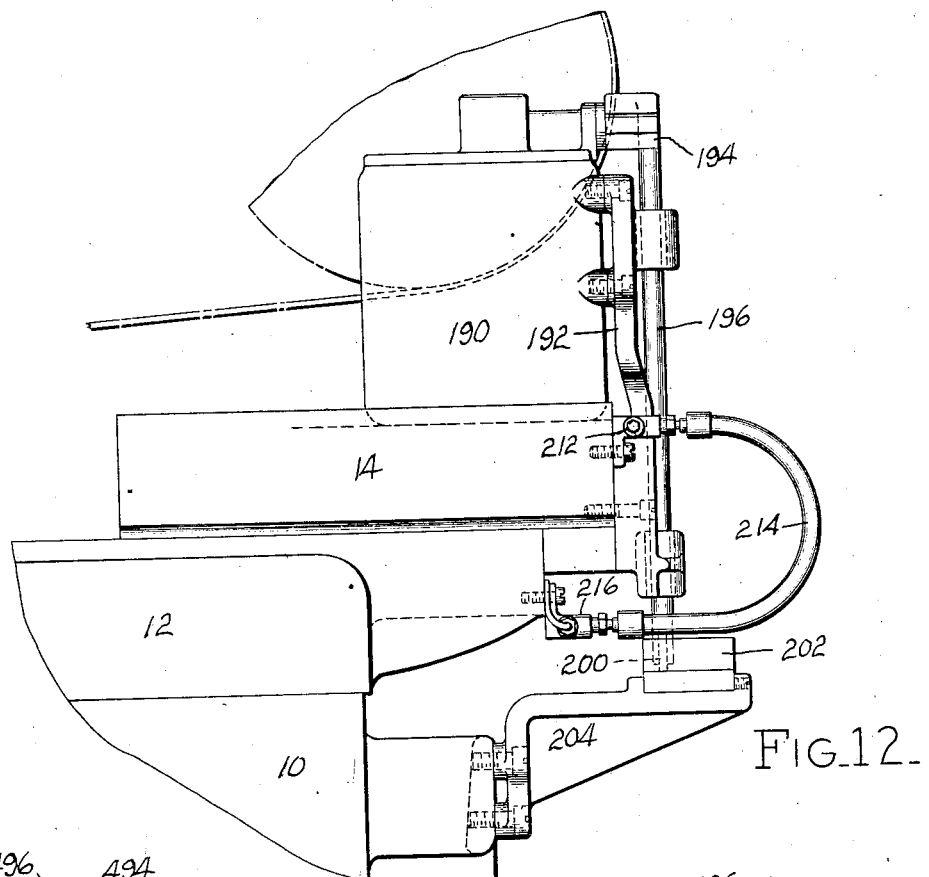
Fig. 12 is an end view of parts appearing in Fig. 11.

As appears best in Figs. 2, 11 and 12, the retraction of the main slide is caused to effect oiling of the various slides. A standard lubricating unit 190 is secured to a bracket 192 mounted on the rear of the cross slide 14. An arm 194 which controls the unit bears on the upper end of a push rod 196 which is vertically slidable in bushings in lugs of the bracket 192, the push rod being held from rotation by a pin 198 which enters a slot in the lower lug. The lower end of the push rod carries a cam roll 200 adapted to ride on a cam 202 fastened to a bracket 204 which is secured on the rear of the main frame. A pipe 206 on the lubricating unit 190 leads to a junction 208 from which a pipe 210 leads horizontally along the rear of the cross slide to a junction 212. A flexible conduit 214 leads from this last junction to a similar lower junction 216 which is fastened on the main slide. Drip plugs lead from the last junction to conduits which carry the oil into a groove of the main slide, the groove leading to conduits which extend down through the main slide to its front and rear slideways on the main frame. Another oil pipe 220 (Fig. 2) from the junction 208 leads to a seven-way junction 222 and from that seven-way junction, lubricant is distributed to the various slideways, a little oil being fed at every cycle under control of the cam 202.

The advance and retreat of the main slide 12 to get the grinding wheel into and out of the work controls the loading of the work head and ejection of the work as well as movement of a work gauge into and out of operative position. The gauge in turn controls the cessation of feed of the cross slide and starts a time relay during which the wheel sparks out before the action of which it is retracted by the reversible motor which actuates the main slide. The gauge is retracted a little way from the work by a solenoid prior to sparking out so that the gauge will not mark the finished work. The machine is a convertible one to the extent that it will grind straight bores when the work head is fixed in the proper angular position and it will grind curved bores when the work head is oscillated on an axis. Within the term straight bores are included cylindrical and conical surfaces such as may be ground by straight line reciprocation of a grinding wheel.

For the grinding of curved bores, the constant reciprocation of the grinding wheel is dispensed with and the work head oscillates on a ball bearing and, when the machine grinds cylindrical or tapered bores, the ball bearing is replaced by an adapter and the oscillating mechanism is disconnected.

Control of movable parts on the work head as the main slide is actuated is effected by a forked cam 234 (Figs. 1, 14 and 16) which is connected to the main slide by a rod 236 and a coupling 238. The cam has its forked arms connected by a plate 239. The forked cam straddles a square central portion on a vertical plunger 240 which is round near each end where it is slidable vertically in bushings 242 carried one by an oscillatable column 244 and one by a plate 246 attached to a work head base 248. Plate 246 is recessed underneath and centrally for the cam and is also bolted to the top of a swivel base 250. The plunger has an upper cross pin 252 rotatably supporting a pair of antifriction rollers 254 which ride on the forked cam, the rollers acting as cam follower rolls to lift the plunger when the cam is moved longitudinally. The upper end of the plunger operates an arm on a rock shaft on the work head, as will appear, to control various functions and carries a dust cap 256 enclosing an annular projection on the plate 246. The plunger is vertically slotted at 258 for a lower cross pin 260 on which a second pair of antifriction rolls 262 are mounted to support the forked cam for easy sliding. The cross pin 260 is supported at the ends in vertical arms of a yoke 264 which rests on a ball thrust bearing 266 set in a recess of the oscillating column.

The top of the oscillatable column is secured to the swivel base 250 which can be mounted for oscillation or for mere angular adjustment. If the swivel base is to be oscillated, it is supported by a large ball bearing 270, the upper race ring 272 being secured to the swivel base and the lower race ring 274 being secured to the main frame. If the swivel base is merely to be angularly adjusted, the ball bearing is replaced by an adapter ring 276 (Fig. 1). This adapter ring is fastened by screws and dowel pins to the swivel base 250 and has a circular groove 278 of T-shaped section to receive headed nuts 280 which are threaded on clamping bolts 282 passed up through a flange on the frame. A segment 284 having a scale marked in degrees is attached to the swivel base and co-operates with a pointer 286 on the frame to indicate the angular adjustment. Clamping screws 290 pass down through arcuate slots 280 in the segment into the frame to hold the adjustment. The plunger 240 is held from rotation because its square central portion is straddled by the forked cam 234, the latter in turn having connection by the rod 236 with the main slide. The round ends of the plunger however allow the swivel base 250, plate 246 and the work head base 248 to swivel or oscillate around the axis of the oscillatable column.

Figures 14, 14A:
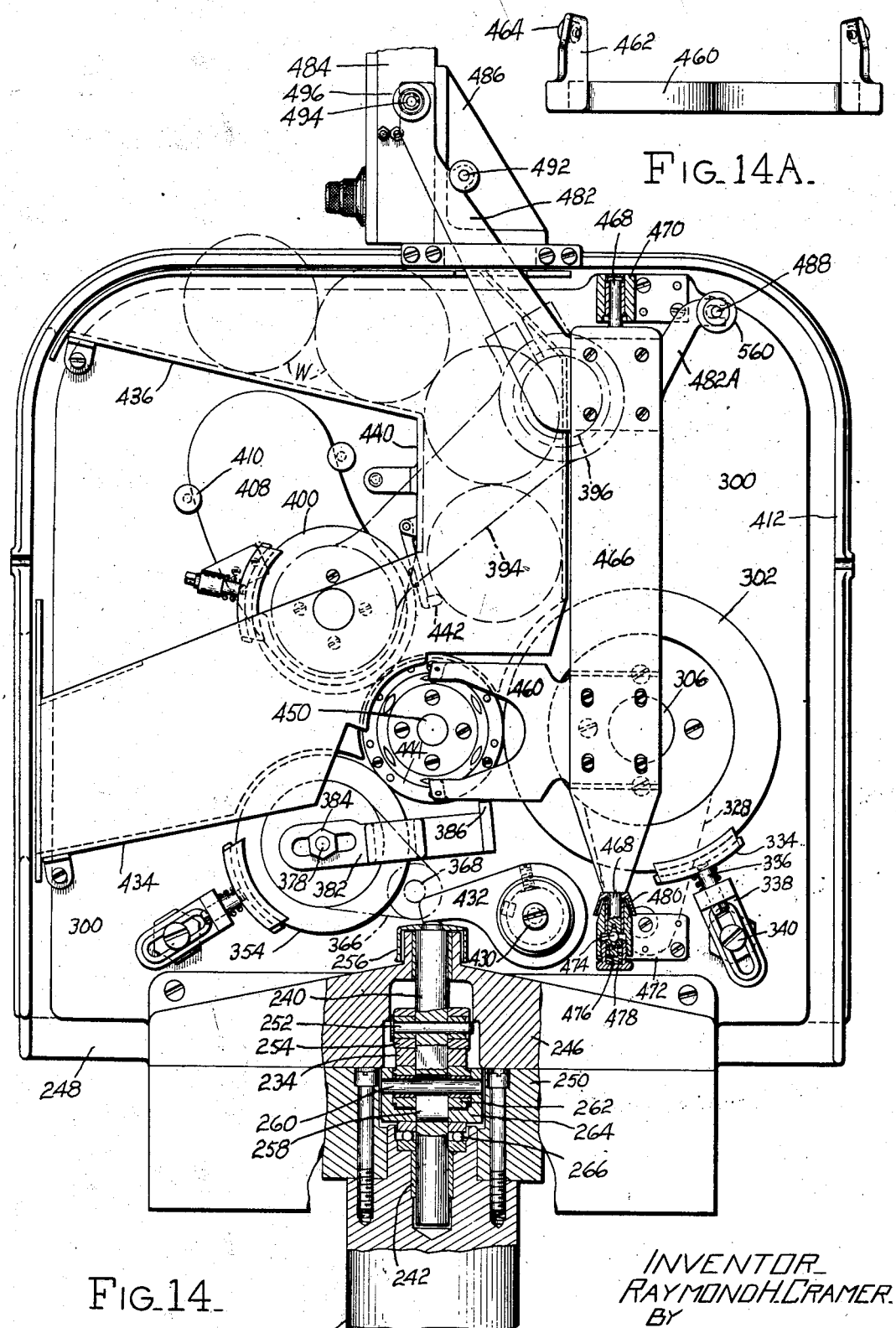
Fig. 14 is an end view, partly in section, of the work head.
Fig. 14A is an enlarged view of a feeler gauge.
Figure 15:
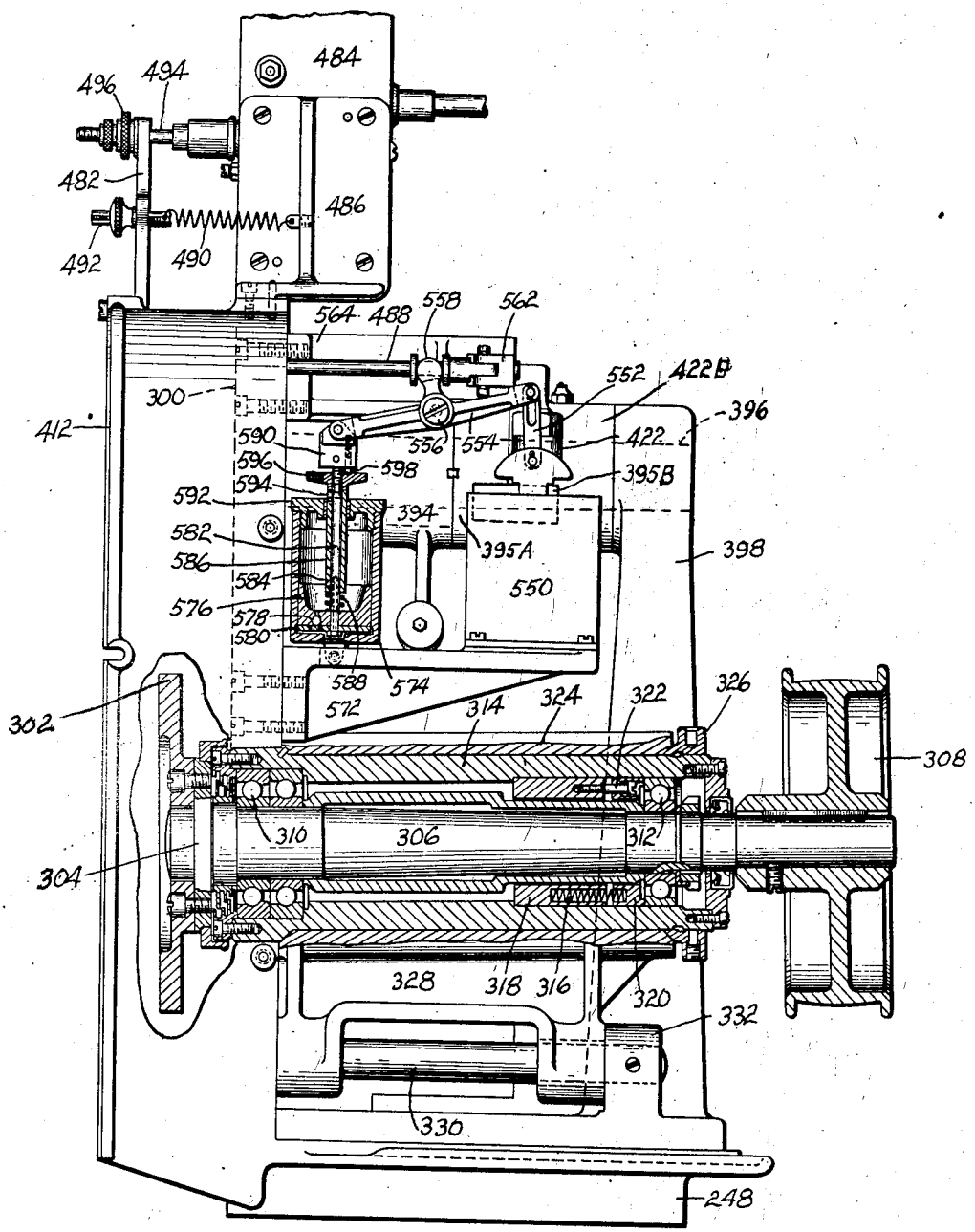
Fig. 15 is a rear view of the work head, the regulating wheel mounting and a dash pot being in section.
Figure 17:
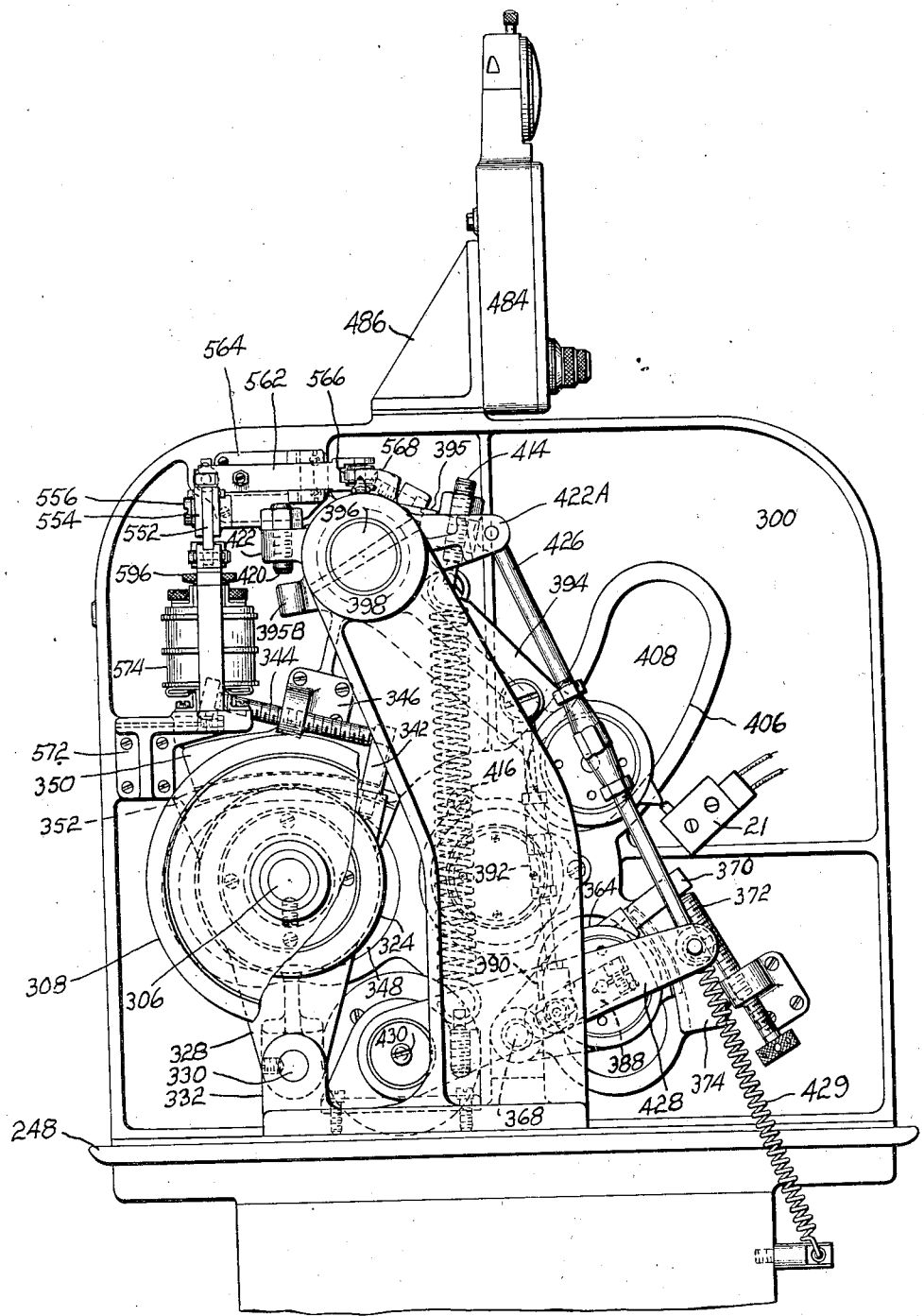
Fig. 17 is a right hand end view of Fig. 15, a solenoid being omitted.

The work head is of the chuckless type comprising a series of work supporting rollers or wheels one of which is moved bodily in every cycle to release a finished piece and feed in a new piece somewhat as shown in patent to Cramer 2,168,675. The work head base 248 has an upright standard 300 and the various work-engaging wheels lie on one side of the standard while the heads which support the wheels project through to the other side of the standard. A regulating wheel 302 (Fig. 15) is fastened to a collar 304 on a drive shaft 306 driven by a pulley 308. The shaft is journalled in ball bearings 310 and 312 in a housing 314, the bearing 312 being urged axially by coil springs 316 interposed between a sleeve 318 and a ring 320 which abuts against the outer race ring. Headed studs 322 limit the movement of the ring 320. The ends of the housing are closed by suitable seals and caps. The housing is shouldered and clamped in a head 324 by a nut 326, the head being the upper end of an arm 328 pivoted on a shaft 330 supported by the standard 300 and by a lug 332. As shown in Fig. 14, the wheel 302 is provided with a wiper held in a channel of a plate 334 on a spring pressed stud 336 guided in an angle piece 338 which is slotted to receive a clamping screw 340. As shown in Fig. 17, the head 324 carries a post 342 engaged by an adjusting screw 344 threaded in a lug 346, this being to adjust the arm 328 around the pivot shaft and so locate the regulating wheel. The standard 300 is slotted at 348 to permit the head 324 to swing a limited distance. The head is clamped in adjusted position by an arcuate clamping plate 350 engaging an arcuate rib 352 on the head. The shaft 306 of the regulating wheel is slightly skewed or tilted out of the horizontal.

Figure 16:
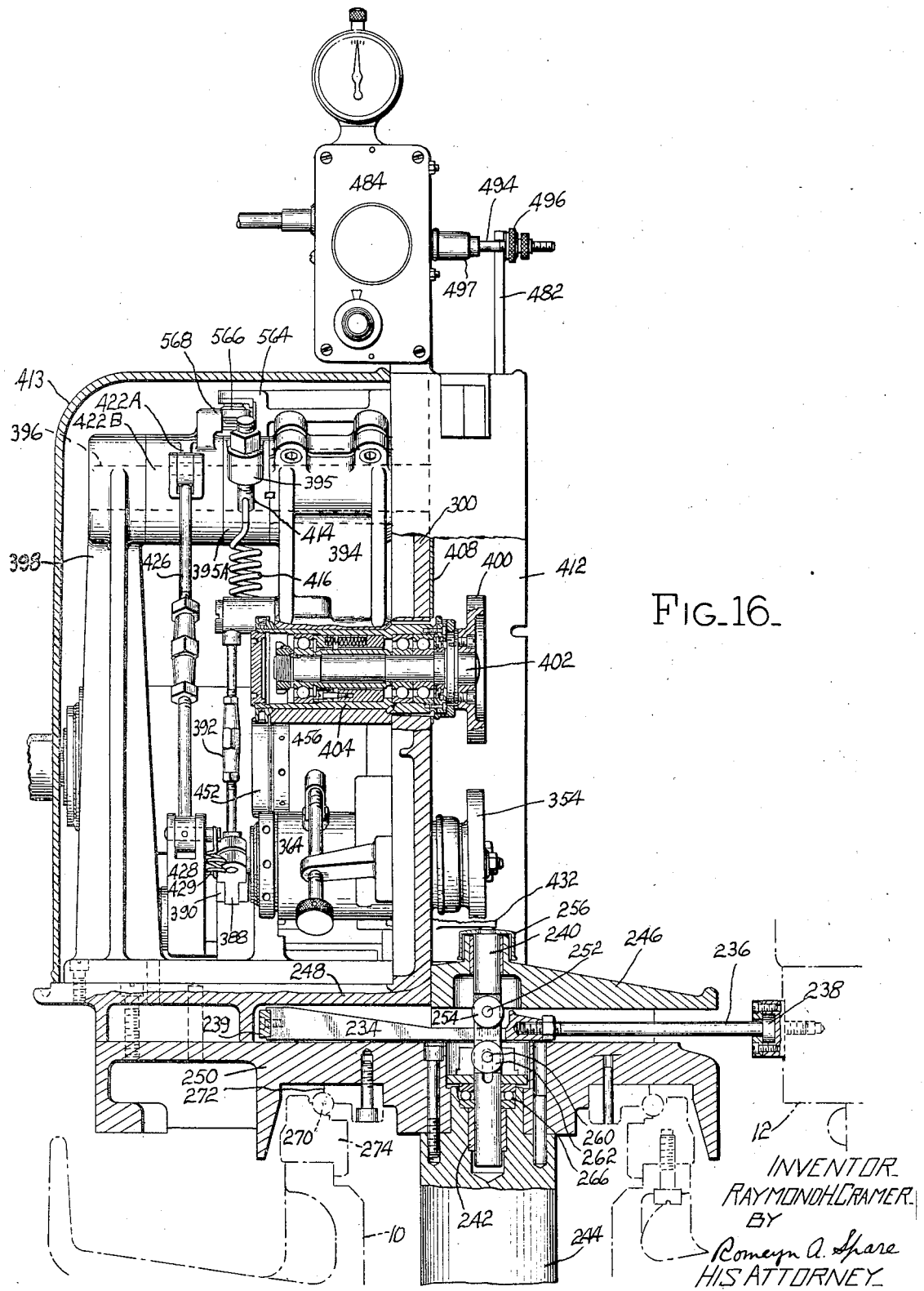
Fig. 16 is a front view of the work head, its mounting and that for the pressure idler being in section.
Figure 18:
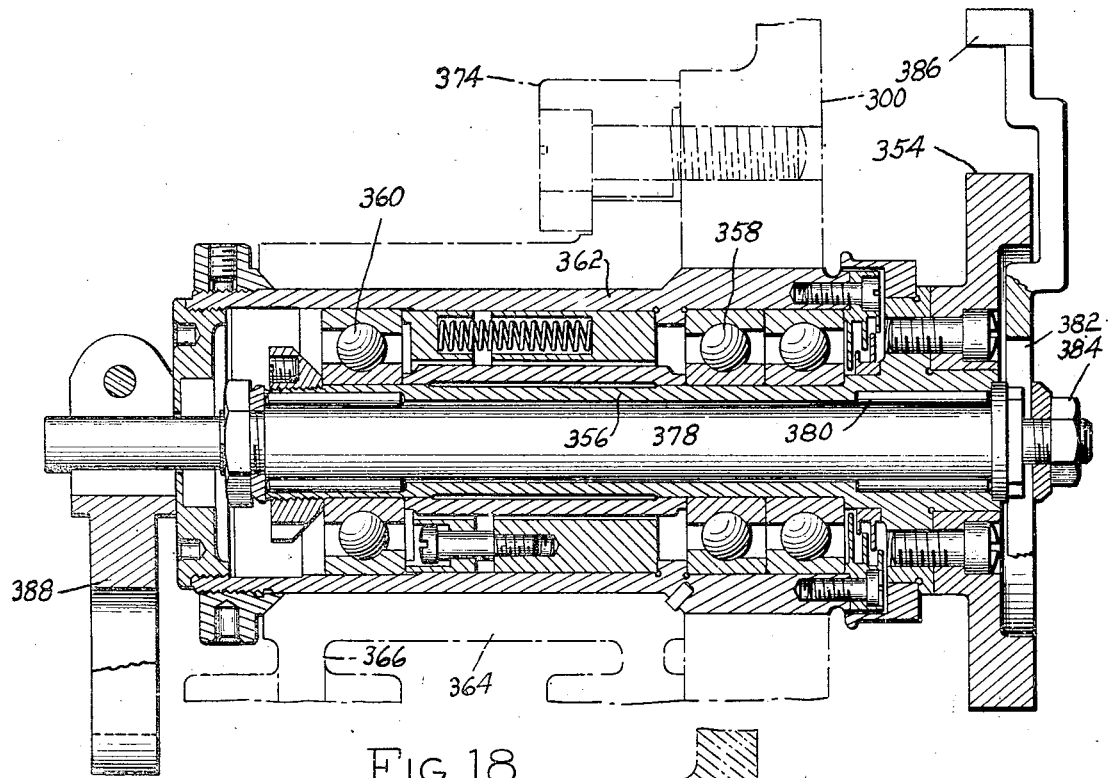
Fig. 18 is a horizontal sectional view of the mounting for the supporting idler and the ejector operating means.

Referring to Figs. 14, 16 and 18, a rotatable work supporting idler wheel 354 is screwed to a collar on a hollow supporting shaft 356 journalled by ball bearings 358 and 360 in a housing 362 which is clamped in a head 364 at the upper end of an angularly adjustable arm 366 mounted on a pivot 368 (Fig. 14). The arm and head are adjustable angularly by a post 370 (Fig. 17) engaged by an adjusting screw 372. As shown in Fig. 18, the head is clamped in adjusted position by a clamping plate 374. The wheel 354 has a suitable wiper similar to that for the wheel 302. An ejector shaft 378 (Fig. 18) is journalled for rocking movement by roller bearings 380 in the hollow shaft 356 and carries at one end a slotted arm 382 clamped by a nut 384 and having a work ejector 386, the other end of the shaft being clamped to a slotted arm 388 having an adjustable pivotal connection with a clevis 390 (Figs. 16 and 17). The clevis is connected to a turnbuckle 392 which is pivoted at its upper end to an arm 394. The upper end of the arm 394 is split and clamped on an axial projection of the hub 395A of a lever 395 which turns freely on a rock shaft 396 which is journalled in the standard 300 and in the upper end of an upright bracket 398.

Figure 13:
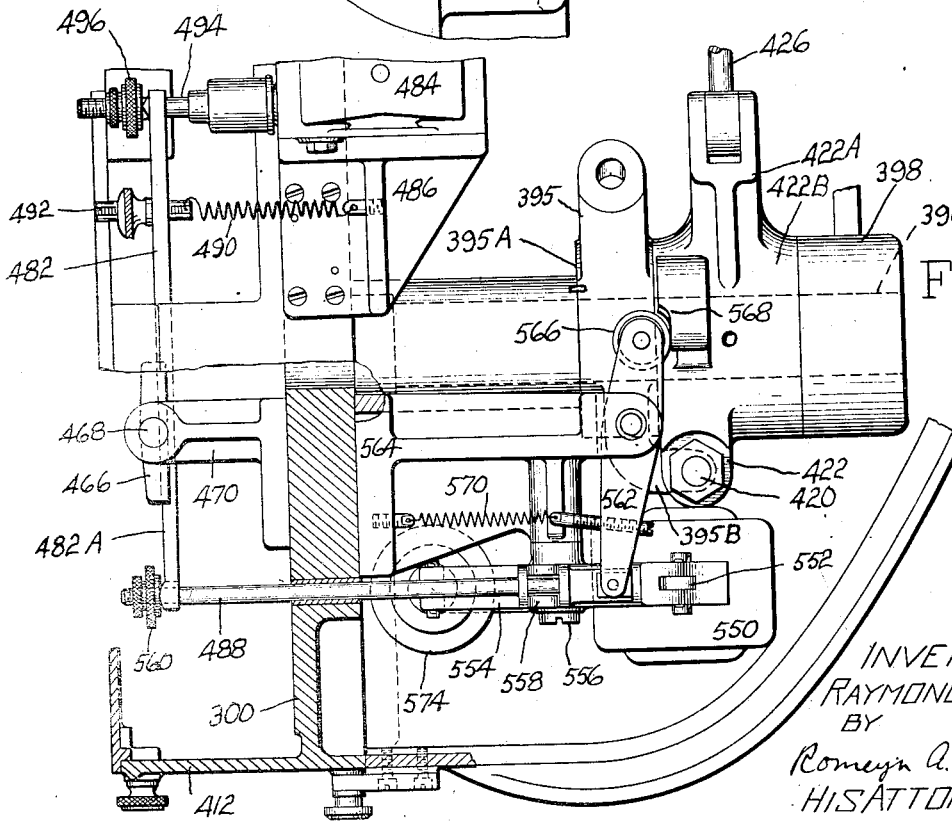
Fig. 13 is a plan view of gauge operating mechanism, a portion of the supporting standard being in section.

An upper or pressure idler wheel 400 (Fig. 16) is clamped to a collar on a shaft 402 journalled in ball bearings in a housing 404 which is clamped in the free end of the arm 394. The housing travels in an arcuate slot 406 (Fig. 17) in the standard 300 and supports a thin cover plate 408 which surrounds the housing and covers the slot as the plate slides under the heads of its guide screws 410 (Fig. 14). The regulating wheel 302 and the supporting idler wheel 354 have their pivoted arms adjusted angularly so they will support work-pieces of selected sizes with their centers in the same axis. This adjustment is selected for the size of work and fixed. The pressure idler wheel 400 is swung bodily at every cycle of grinding and controls feed of the work. Its arm closes a safety switch 21 if the work is properly seated. All of the wheels are on the exposed side of the standard but are partially enclosed by a flange 412 projecting from the standard and by a front cover plate having a hinged section, most of the cover being removed and only a portion being shown in Fig. 13. The supporting housings of the wheels project through the arcuate slots in the standard, the supporting arms and their operating means being enclosed at the back of the standard by a rear cover plate 413 (Fig. 16).

The lever 395 (on whose extended hub 395A the idler arm 394 is clamped) carries an adjusting screw 414 connected by a coil spring 416 with an anchoring stud on the base plate. This spring transmits the work holding pressure to the idler. Another and shorter arm 395B on the lever 395 is offset (Figs. 13 and 17) to lie under and against an adjusting screw 420 threaded in a short arm 422 projecting from the hub 422B of an idler actuating lever 422A, the hub 422B being pinned to the rock shaft 396 by a taper pin. The hub 422B of the lever has a cam to actuate a gauge as will appear. The long arm 422A of the lever is forked and pivotally connected to a long turnbuckle 426 which has its lower end pivoted to the forked end of a long arm 428. A coil spring 429 urges the long arm downwardly. The long arm is pinned to the rear end of a rock shaft 430 journalled in the standard 300 and in a lug on the work head base. An arm 432 (Fig. 14) is pinned to the other or front end of the rock shaft 430 at the exposed side of the standard and this arm has a hardened insert bearing upon the top of the plunger 240 which is actuated by movement of the main slide.

Thus, vertical movement of the plunger 240 as the main slide retreats, will rock the shaft 430, the lever 422A, the lever 395, and the arm 394, thereby raising or lowering the pressure idler wheel 400. Raising of the pressure idler wheel will also act through the shorter of the two turnbuckles (Fig. 17) to rock the slotted arm 388 and the ejector shaft 378 (Fig. 14) with the connected work ejector 386, thereby lifting a finished piece and discharging it forwardly over the supporting idler wheel 354 into an inclined discharge chute 434. This chute has supporting and spacing lugs fastened to the standard 300 and delivers the work through an opening in the forwardly projecting flange 412 or guard on the standard. Another opening at the upper portion of the flange provides for inserting work into an inclined entrance portion 436 of the chute which, with a vertical portion 440, acts as a magazine. The unground work W runs down until stopped by a pivoted retaining arm 442 which has a hardened portion bearing on the pressure idler wheel 400. When the pressure idler wheel is down in operative position against a piece of work, the retaining arm supports the supply of unground work. When the pressure idler wheel is raised to make room for the ejection of a ground piece, the retaining arm lets a new piece onto the then-raised ejector 386 which subsequently lowers the new piece to grinding position.

Figure 19:
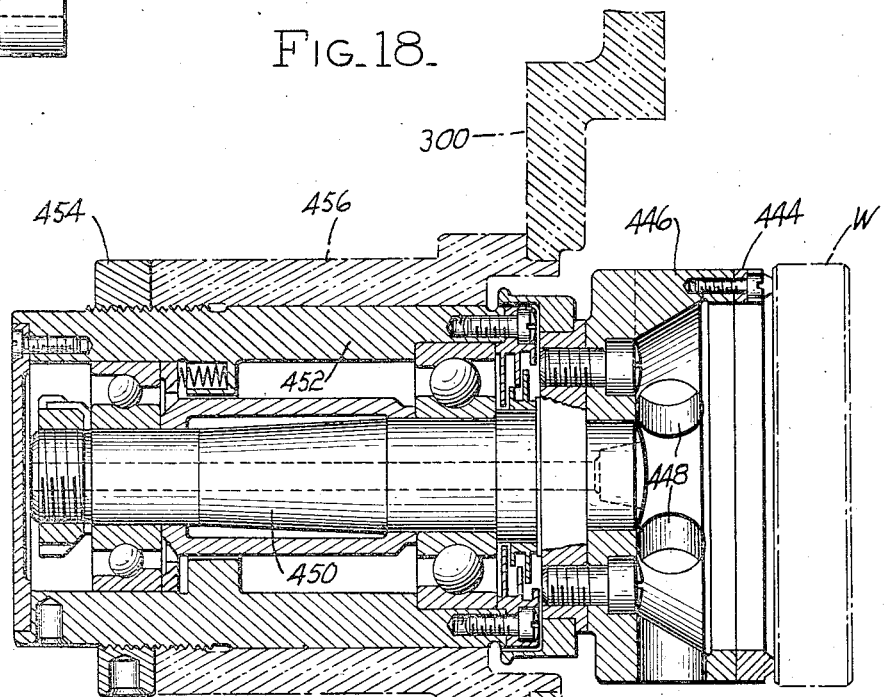
Fig. 19 is a sectional view of the mounting for the backing up idler.

The regulating wheel, the pressure idler wheel and the supporting idler wheel preferably have their shafts slightly skewed with respect to the axis of the work so that they urge the work axially against an annular ridge on a locating ring 444 (Figs. 14 and 19) fastened by screws on a forwardly projecting flange of a backing wheel 446. This flange is adapted to receive a flange on a dummy or set-up piece which is used in locating the work engaging wheels. The flange has a series of radial holes 448 for escape of cooling fluid and grit. The backing wheel is fastened by screws to a collar on a supporting shaft 450 which is concentric with the work axis and journalled for free rotation in bearings carried in a housing 452 which is threaded for part of its length and clamped by a nut 454 in axially adjusted position in an internally threaded portion of a flanged adapter sleeve 456 fastened to the back of the standard 300.

A forked feeler gauge 460 (Figs. 14 and 14A) has feeler arms 462 projecting into the work and having diamond feelers 464 to engage the tapered bore of the work. The gauge is mounted to swing into or out of the work under control of a cam on the lever 422A which is controlled by the plunger 240 when the main slide 10 advances or retreats. The gauge is secured by screws to a flat vertical bar 466 having upper and lower trunnions 468, the upper trunnion being journalled in a bushing carried by a bracket 470 fastened to the standard, and the lower trunnion being journaled in a bushing in a bracket 472. The lower trunnion has a conical seat resting on a ball 474 seated in a conical seat in a plug 476. The plug is supported by a coil spring 478 in an adjusting nut threaded in the supporting bracket 472. The gauge can thus float to center itself with respect to the work. A skirt 480 covers the lower trunnion and a tapered extension of the lower bracket to keep out grit and cooling compound. A flat plate 482 forming a lever is fastened to the upper portion of the vertical bar 466 and has a pair of arms, one a long inclined arm which inclines upwardly to the side of an indicator or gauge housing 484 mounted on a bracket 486, the other and shorter arm 482A being forked to straddle a rod 488 which is slidable horizontally through the standard.

Figure 20:
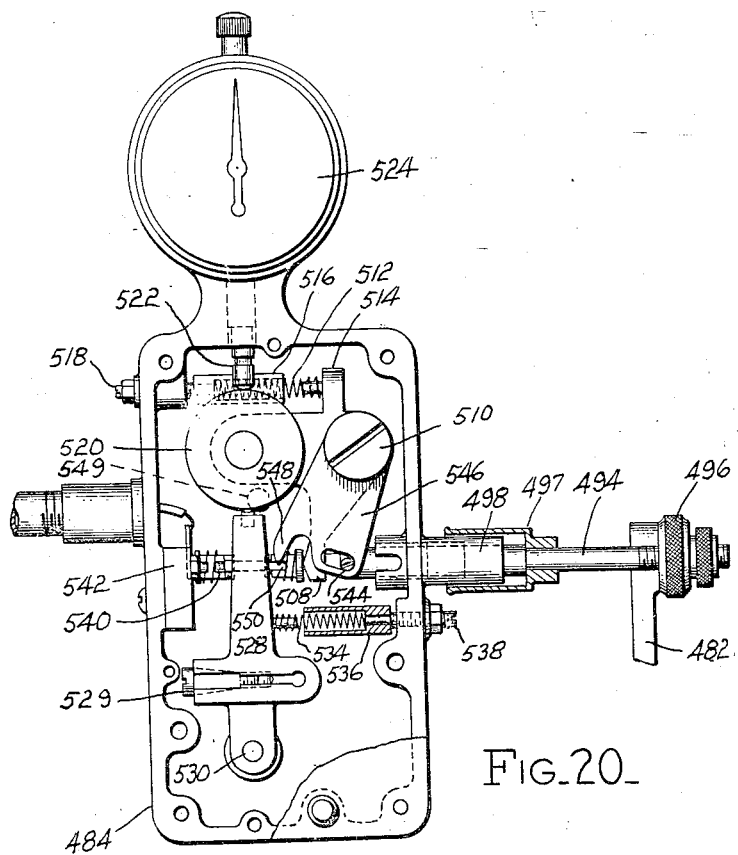
Fig. 20 is a front view of the sizing gauge, the cover being removed and some parts being in section.
Figure 21:
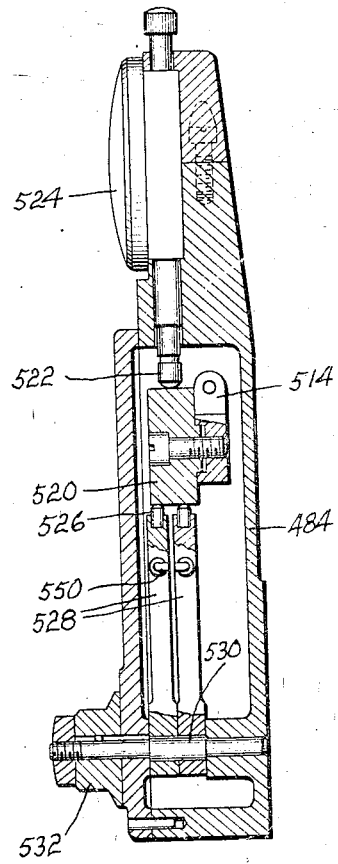
Fig. 21 is a vertical sectional view of parts appearing in Fig. 20.
Figure 22:
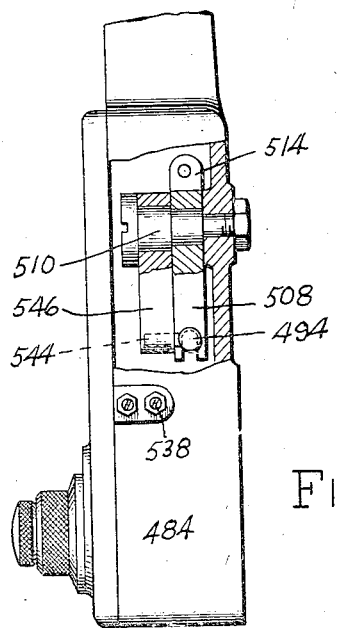
Fig. 22 is a right hand end view of Fig. 20 with parts in section.
Figure 23:
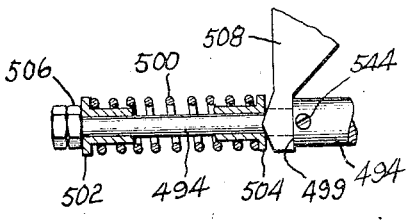
Fig. 23 is an enlarged detail view of parts appearing in Figs. 20 and 22.

A coil spring 490 (Figs. 13 and 15) is anchored at one end to the bracket 486 and at the other end to a slabbed off adjusting screw 492 fitting loosely in a square hole in the inclined arm 482 and having an adjusting nut. Thus the arm 482 is urged towards the indicator housing and its upper end is forked to straddle a gauge rod 494 which is threaded outside of the fork to receive adjusting nuts 496. The gauge rod carries a dust guard 497 (Fig. 20) and is guided in bushings in a boss 498 on the gauge housing and, as shown in Figs. 20 and 23, its inner end is reduced in diameter to form a stop shoulder 499. A coil spring 500 is interposed between flanged sleeves 502 and 504 on the rod. One sleeve 502 bears against nuts 506 at the free inner end of the gauge rod and the other sleeve 504 bears against a forked arm 508 on a three-armed lever which is pivoted on a shouldered screw 510. The forked arm 508 is held by the coil spring 500 against the stop shoulder 499 except when the gauge is being reset. The forked arm is urged clockwise in Fig. 20 by a coil spring 512 interposed between a lug 514 on the lever and a sleeve or barrel 516 which is adjustably anchored to the gauge housing by a screw 518. A third arm on the lever carries a hardened cylinder 520 which engages the plunger 522 of a dial indicator 524 and also engages a pair of hardened inserts 526 at the upper end of a pair of sizing levers 528. Each of the sizing levers is adjustable as to length by means of a tapered expanding screw 529. These levers are pivoted in upright position on an eccentric shaft 530 which is journalled in the gauge housing for angular adjustment by a knob 532 having a lock nut. Each sizing lever is urged in a direction to snap past the cylinder 520 by a coil spring 534 engaging the lever and housed in a sleeve or barrel 536 which is adjustably anchored to the gauge housing by a screw 538.

As the work bore increases in size, (the forked arm 508 being held against the shoulder 499 by the spring 500) the lever 508 is swung clockwise by the spring 512 and the guage rod 494 moves into the gauge housing. The cylinder 520 will move with the lever 508 and trip the sizing levers which are adjusted to trip in succession. Each sizing lever has a contact screw 540 to engage a fixed contact on a block 542 of insulating material and thereby completes an electric circuit. One circuit controls the stopping of cross feed and the other controls the starting of a time delay relay and partial retraction of the fork gauge as will appear. The inward movement of the gauge rod 494 is restricted and controlled by the forked arm 482 which is in turn controlled by the fork gauge. On the other hand, the swinging of the fork gauge away from contact with the work resets the gauge by pulling out on the gauge rod. For this purpose, the rod has a pin 544 entering an arcuate slot in a resetting lever 546 hung on the pivot screw 510, the resetting lever having an arm or hook 548 which reaches behind a little hook or bent arm 550 carried by each sizing lever. Thus the sizing levers 528 are drawn back under the cylinder 520 to reset position and the spring 500 will be compressed temporarily as indicated in Fig. 20. The pin 544 limits the outward movement of the gauge rod and a stop pin 549 limits the back swing of the lever 508.

One of the closed circuits made by the gauge energizes a solenoid 550 (Fig. 15) having a slotted link 552 slidably and pivotally receiving a pin on a lever 554 which is pivoted at 556. The lever has a short upwardly projecting arm 558 forked to straddle the sliding rod 488 between a pair of collars. Thus, energizing of the solenoid will slide the rod so that an adjusting nut 560 (Fig. 13) on the rod will engage the short arm 482A of the flat plate or lever 482 and swing the feeler gauge a short distance sufficient to remove it from contact with the work and thus prevent marking of the work as the grinding wheel sparks out. The slot in the link 552 provides lost motion to allow the gauge to be finally and completely retracted later with its sizing levers reset and the electric circuits broken.

The final and complete withdrawal of the gauge to allow the work to be ejected occurs as follows. A cam lever 562 (Fig. 13) is pivoted on a bracket 564, one end of the lever being pivoted to the rear of the rod 488. The other end of the lever carries a cam roll 566 in the path of the above mentioned cam 568 on the lever 422A which is rocked when the work is ejected. A coil spring 570 urges the cam roll 566 towards the cam. A bracket 572 fastened to the rear of the standard supports the solenoid 550 and a dash pot mechanism which postpones the entry of the feeler gauge into the work until grinding is well along to completion.

The dash-pot mechanism comprises a cylinder 574 pivoted to the bracket 572. A piston 576 in the cylinder has a ball check valve 578 loose in a cavity which communicates through a small port with the upper side of the piston and through a plurality of ports in a thin plate 580 with the under side of the piston. The plate and the piston are attached to a shouldered piston rod 582 by a nut. The piston rod has a longitudinal port opening into the space below the piston, this port extending vertically upwardly and communicating at its upper end with a radial port which leads to a radial port 584 in a sleeve 586. The sleeve is capable of longitudinal adjustment on the piston rod against the tension of a coil spring 588 to block off more or less of the radial port in the piston rod. The upper end of the piston rod is secured to a block 590 which is loosely pivoted to the lever 554. The sleeve 586 is guided in a bushing in a cylinder head 592 and its upper end is radially slotted to engage a pin 594 projecting from the piston rod so that the radial ports in the piston rod and in the sleeve will stay in vertical alignment. The sleeve is adjusted downwardly to block off a selected portion of the radial port in the piston rod by means of a hand nut 596 threaded on the piston rod and engaging the top of the sleeve. The top of the nut has a series of shallow recesses any one of which may be engaged by a spring pressed pin 598 in the block 590 to hold the nut in adjusted position.

Thus, the upward movement of the piston is substantially unrestricted because the ball check valve will open the ports therein. This allows the feeler gauge to be finally retracted quickly by the cam 568. When, on the other hand, the cam releases the cam roll near the beginning of a cycle, the coil spring 570 supplemented by the coil spring 490 will try to force the gauge into the work but the ball check valve will close and the piston will move slowly downwardly as the fluid leaks up through the ports in the piston rod and the radial port 584 in the sleeve, this latter port so adjusted with respect to the radial port in the piston rod that contact of the gauge with the work can be made to occur just before the piece reaches the predetermined size, thus saving wear on the gauge points.

Before describing the wiring diagram, the mechanical operation will be summarized. Assume first that the machine is set up for grinding tapered bores and that the main slide is retracted so that the pressure idler is lifted, the gauge retracted and the dressing diamond at the left of the grinding wheel. A reversible motor which actuates the main slide is started and several things occur as the main slide advances. The forked cam 234 lets the plunger 240 on the work head come down so that the coil spring 416 pulls the pressure idler 400 down on a new workpiece which was released onto the ejector when the previous piece was ejected. As the pressure idler descends, the cam 568 on the lever 422A releases the cam lever 562 to pressure of the spring 570 and the gauge rod 488 controlled by the lever 554 and the dash-pot mechanism lets the gauge enter the work slowly without contact at first with the work surface. Meanwhile the headed plunger 162 on the main slide runs down the cam 170 on the frame and the dresser slide 102 is spring operated across to the right of the grinding wheel, the dresser obtaining a compensated feed as it reaches the end of the stroke.

The grinding wheel, which always reciprocates while a run of tapered or cylindrical work is being ground, is brought into the work by advance of the main slide and receives a cross feed by pawl and ratchet mechanism for the grinding operation. The gauge makes actual contact with the work surface a little while before the predetermined size is reached and thereafter actuates the sizing device to complete the first electric gauge circuit to stop the ratchet operated cross feed of the grinding wheel. The wheel sparks out with a fine feed due to the spring or set in the grinding spindle. The gauge then completes the second circuit which energizes the solenoid 550 to partially retract the gauge, and starts a time switch which controls the sparking out period. At the end of this period, the main slide is retracted by its reversible motor. The forked cam 234 causes the pressure idler and the ejector to rise and the cam 568 completes retraction of the gauge so the finished piece can be ejected over the supporting idler wheel. As the main slide thus retreats, its plunger 162 rides up the cam 170 on the frame and the dresser slide 102 is advanced to the left to cause the dressing diamond to true the grinding wheel. The lubricating unit controls a shot of lubrication to the various slideways as the main slide retreats. The reversible motor then advances the main slide to repeat the cycle.

When converting the machine for grinding of curved bores, the mechanism for oscillating the work head on the oscillating column 244 is connected up and oscillation does not stop while a run of work is being ground. The mechanism which gives the grinding wheel its constant reciprocation is locked or disconnected, and a grinding wheel having its surface dressed to arcuate shape is substituted for the cylindrical wheel which grinds tapered bores.

*Diagram*

In the diagram, a 440 volt, 3-phase line supplies four motors with current. The wheel driving motor 45 and a cross feed motor 31 are connected in parallel and controlled by a common series of switch blades. Another series of switch blades controls the motor 84 which constantly reciprocates the upper slide. A reversible motor 33 has two sets of switch blades. This motor reverses a worm gear shaft which controls the advance and retreat of the main slide in a manner similar to the disclosure in the Van Norman Patent 2,149,409. The feed motor 31 corresponds in function to the motor in the patent which oscillates the work head and actuates a pawl and ratchet to turn a cross feed screw. The main slide operating mechanism may also give the cross slide a large scale movement additional to the fine feed by the ratchet mechanism. It will be understood that the oscillating mechanism is not used when the present machine is set up to grind tapered or cylindrical bores and that, if curved surfaces are ground, the oscillating mechanism is used but the constant reciprocation of the grinding wheel is not. The diagram will be described with reference to the first mentioned set-up. In the diagram, mechanical connections are indicated by dash lines while arrow-heads indicate current directions. Lost motion connections synchronized with the main slide actuate switches 23A and 23B as the slide reaches out-position and actuate switches 24A, 24B, 25A and 25B as the slide reaches in-position.

To begin the cycle, assume a work-piece W is correctly seated in the work head, the pressure idler 400 being down and holding a safety switch 21 closed. The main slide 12 is forward so that a cam 37 has allowed a second safety switch 21A to open. The grinding wheel 42 is reciprocating inside of the work and being fed rearwardly against the work. The three uppermost blades on the switches controlled by the coils 1 and 2 are closed and all motors will be running except the reversible motor 33 which has just advanced the main slide and stopped with the three uppermost blades on the switches controlled by the coils 3 and 4 open. The forward feed of the cross slide 14 is effected by feed motor 31 which has a suitable mechanical connection to actuate the cross feed screw 18 by a pawl and ratchet 27. The fork gauge 460 is in engagement with the work and slowly moving the sizing gauge contacts represented by switches 12A and 12B.

When the work is ground nearly to size, the roughing gauge switch 12A closes a circuit which energizes a coil 5 to move the normally closed switch 5A to open position. This breaks a circuit from a 16-volt line and so de-energizes a solenoid 11 to allow a spring to retract the feed pawl and stop the ratchet feed.

Grinding continues due to the built up spring or set in the grinding spindle until the second gauge switch 12B closes. This energizes a coil 6 which is in circuit with the switch 12B and a ground via a switch 25B which latter became closed when the main slide reached the "in" or forward position. Coil 6 closes normally open switches 6A, 6B, and 6C. Switch 6A closes a circuit containing a time delay relay 19. Switch 6B closes a circuit to energize the solenoid 550 which partially retracts the gauge from the work. Switch 6C closes to provide a holding circuit for coil 6 via the 16 volt line, switch 6C to the closed switch 23A and a ground.

When the time relay runs its allotted time, a pair of normally open contacts 19A on the relay close, energizing a coil 8 and closing normally open switch 8A and opening normally closed switch 8B. Switch 8A causes coil 4 to be energized to close its three uppermost switch blades and start the reversible motor 33 and the main slide 12 out, the circuit through coil 4 being completed from the line through closed switch 3A, coil 4, closed switch 8A, and closed switch 23A to a ground. As the main slide begins its retreat, switch 24A closes, switch 24B opens, switches 25A and 25B open, while switch 21A is closed by cam 37.

When switch 8B opens, it de-energizes a coil 9, letting switch 9A open and closing switch 9B. (Switch 9A should be opened at this time because otherwise the reversible motor would immediately reverse and send in the main slide without completing the outward stroke because current could then energize the coil 3 via the main line, closed switches 21A, 24A, 4B, coil 3, switch 9A, past open switch 17A, through reversing switch 17 and closed switch 1A to closed switch 7B and a ground. The switch 4B is at this time in closed position because coil 4 becomes de-energized when the slide reaches out-position because, although switch 8A is closed, switch 23A is opened. The switch 9B should be closed when the switch 4A is open so that the coil 1 will stay energized with its uppermost blades closed and current can thus continue to the wheel driving motor 45 and the wheel feed motor 31.) Also (assuming the switch 25A is actuated by the slide mechanism and not permanently closed) as the slide 12 retreats or moves out and switch 25A opens, the latter will cause the reciprocating motor 84 to stop by breaking the circuit in coil 2. This is optional however and it is preferred that switch 25A be left closed and not be operated by the slide mechanism and hence motor 84 can be allowed to run constantly. When switch 25B opens, coil 6 remains energized for an interval due to the holding circuit through switch 6C and switch 23A.

When switch 24B opens, the circuit through the coil 11 is necessarily open irrespective of the position of switch 5A. When switch 24A closes, it sets a circuit in partially complete condition for the coil 3 (which will later be energized via the main line, safety switches 21A and 21 in turn, switch 24A, switch 4B, coil 3, switch 9A, past switch 17A, reversing switch 17, and switches 1A and 7B to a ground.

As the slide 12 reaches its maximum out position, switch 23A opens and switch 23B closes. The opening of switch 23A opens the circuit through the coil 4 (independently of the opening of switch 8A). The opening of the switch 23A also opens the circuit through the coil 6 and switch 6C allowing switches 6A, 6B and 6C to open. The opening of switch 6A de-energizes the time delay relay, the time delay relay in turn de-energizing the coil 8, allowing the switch 8A to open and closing the switch 8B. When switch 8B closes, coil 9 is energized, closing switch 9A and opening switch 9B. When switch 6B opens, the solenoid 550 is de-energized. When coil 4 is de-energized, it closes switches 4A and 4B. Switch 4B completes a circuit already partially complete through the switch 24A and energizes the coil 3. The motor 33 reverses and starts the main slide in.

When the main slide starts in, switch 23A closes and switch 23B opens. Switch 21A opens as the slide nears in-position. As the slide reaches its inward position, switches 25A and 25B close (although 25A may be left closed as above explained in order that the reciprocating motor 84 may run constantly). The closing of switch 25B partially completes a circuit including the coil 6 and the finish gauge switch 12B, the latter being open. Also as the slide reaches its inward position, switch 24A opens and switch 24B closes. Switch 24B completes a circuit which energizes the feed solenoid 11 and moves the feed pawl to operative position for actuation by the feed motor. Switch 24A breaks the circuit to the coil 3 and the reversible motor 33 stops for the grinding interval. The cycle is then repeated.

As a further safety feature, when the grinding wheel is worn down to a predetermined diameter, the cross slide 14 opens the switch 20A and closes switch 20B. The machine will continue through its normal cycle until the main slide retreats to its maximum out position and closes the switch 23B and opens switch 23A. Switch 23B closes a circuit including signal lamp 7D and coil 7, switches 20B, 7A and 23B, thereby lighting the signal lamp 7D and energizing the coil 7. Switches 7A and 7B open and switch 7C closes. When switch 7C closes, the circuits through the lamp 7D and the coil 7 remain closed, the current then going through the switches 20B and 7C direct to a ground. When switch 7B opens, the wheel motor 45, the feed motor 31 and the reciprocating motor 84 stop because current no longer can energize the coils 1 and 2. When switch 20A opens, the coil 9 is de-energized, opening the switch 9A and closing the switch 9B. When switch 9A opens, no current can energize the coil 3 and hence the reversible motor 33 cannot be started in the direction which advances the main slide. When switch 7A opens, the switch 23B has no further control of the machine and no motors can be started until a new grinding wheel is substituted and switch 20A reset.

A selector switch 15 is left in the indicated closed position for continuous cyclic operation of the machine as above described but this switch can be manually opened to break the circuit through the coil 9 which will let the slide run to its out position and remain there because the motor 33 cannot be reversed by coil 3 to run in the main slide if the switch 9A is open. With the machine in this condition, the cycle can be restarted by momentarily closing a hand switch 17A which controls re-energizing of the coil 9, closing of the switch 9A and energizing of the coil 3. A hand operated stop switch 13A enables the operator to stop the wheel motor 45, the feed motor 31, and the reciprocating motor 84 at any time because it will break the circuit through the coil 1 and open switch 1A. Motor 33 will stop also if moving the slide in because coil 3 cannot remain energized. A hand operated reversing switch 17 enables the operator to energize the coil 4 at any time the slide 34 is in, to send the slide to its out position. By restoring the reverse switch 17 to initial position, the coil 3 can be energized to send the slide in.

The starting switch 13 is momentarily closed to start the cycle. When it closes, it starts the motors 45, 31 and 84 by energizing the coils 1 and 2. The slide cannot start in unless these motors are running because the holding circuit for these motors also provides a closed circuit including switch 1A and switch 7B for the coil 3. (The holding circuit for coil 1 goes through switch 4A when switch 9B is open.)

Since the two safety switches 21 and 21A are wired in parallel to one another and in series with the switches 24A and 4B, coil 3, and switches 9A and 7B, the reversible motor 33 will not run the slide in if both switches 21 and 21A are open. The work is, of course, finally seated as the main slide is moving in and if the switch 21 does not close (as when the work is not properly seated), the slide will stop because the switch 21A is opened by the cam 37 when the slide approaches the in-position.

I claim:

1. In a grinding machine, a work head having means to drive a work piece in rotation, a wheel head having a rotatably driven grinding wheel, a constantly reciprocating upper slide supporting one of the heads, a cross feed slide supporting and guiding the upper slide, for independent reciprocation thereon, a main slide supporting and guiding the cross feed slide and adapted for advancing and retreating movement to bring the work and the wheel into and out of operative proximity, and means for constantly reciprocating the upper slide on the cross slide to repeatedly cause relative traversing movement between the wheel and the work-piece.

2. In a grinding machine, a work head having means to drive a work piece in rotation, a wheel head having a rotatably driven grinding wheel, a constantly reciprocating upper slide supporting one of the heads, a cross feed slide supporting and guiding the upper slide for independent reciprocation thereon, a main slide supporting and guiding the cross feed slide and adapted for advancing and retreating movement to bring the work and the wheel into and out of operative proximity, a motor mounted on the cross feed slide, a driving connection from the motor to the upper slide to reciprocate the latter in the direction of movement of the main slide and a second motor fixed on the cross feed slide for driving the grinding wheel.

3. In a grinding machine, a work head having means to drive a work piece in rotation, a wheel head having a rotatably driven grinding wheel, a constantly reciprocating upper slide supporting one of the heads, a lower slide adapted for advancing and retreating movement and carrying the upper slide therewith to bring the work and the wheel into and out of operative proximity, and means comprising a crank and a link for constantly reciprocating the upper slide with respect to the lower slide through a predetermined stroke and in the same line of direction as the movement of the lower slide.

4. In a grinding machine, a work head, a grinding wheel head, a movable slide supporting one of the heads and adapted for advancing and retreating movement with respect to the other head, a support for the other head and mounted for turning movement around an axis, a work engaging device on said other head, a plunger shiftable in line with said axis to actuate the work engaging device on said other head in various positions of the support, and means connected to the movable slide for actuating the plunger.

5. In a grinding machine, a work head, a grinding wheel head, a movable slide supporting one of the heads and adapted for advancing and retreating movement with respect to the other head, a support for the other head and mounted for turning movement around an axis, a work engaging device on said other head, an actuating member centered in said axis and movable to actuate the work engaging device on said other head, and a cam connected to the movable slide for operating said member.

6. In a grinding machine, a work head, a grinding wheel head, a movable slide supporting one of the heads and adapted for advancing and retreating movement with respect to the other head, a support for the other head and mounted for turning movement around an axis, a work engaging device on said other head, a plunger shiftable in line with said axis to actuate the work engaging device on said other head, a cam for shifting the plunger, and a connection between the cam and the movable slide.

7. In a grinding machine, a work head, a grinding wheel head, a movable slide supporting one of the heads and adapted for advancing and retreating movement with respect to the other head, a support for the other head and mounted for turning movement around an axis, a work engaging device on said other head, a plunger shiftable in line with said axis to actuate the work engaging device on said other head, a bifurcated cam straddling the plunger and holding it from rotation, a cam follower on the plunger, and a connection between the cam and the movable slide.

8. In a grinding machine, a work head having a work engaging device, a grinding wheel head, a movable slide supporting the wheel head and adapted for advancing and retreating movement with respect to the work head, a support for the work head and mounted for turning movement around an axis, a plunger shiftable in line with said axis to actuate the work engaging device on the work head, a cam slidably mounted on the support, a cam follower on the plunger, and a connection between the cam and the movable slide.

9. In a grinding machine, a support mounted for turning movement around an axis, a work head on the support, a grinding wheel head, a movable slide supporting the wheel head, the work head having work loading devices, and means centered at the axis of the support and actuated by the movable slide for controlling the work loading devices.

10. In a grinding machine, a support mounted for turning movement around an axis, a work head on the support, a grinding wheel head, a movable slide supporting the wheel head, a work ejector on the work head, and means centered at the axis of the support and movable therein for controlling the ejector.

11. In a grinding machine, a support mounted for turning movement around an axis, a work head on the support, a grinding wheel head, a movable slide supporting the wheel head, a work loading means on the work head, a work ejector, and means centered at the axis of turning for operating the loading means and the ejector.

12. In a grinding machine, a support mounted for turning movement around an axis, a work head on the support, a grinding wheel head, a movable slide supporting the wheel head, a size controlling feeler engageable with a work piece on the work head, and means centered at the axis of the support and actuated by the movable slide for moving the feeler with respect to the work-piece.

13. In a grinding machine, a work head, a wheel head, an upper slide supporting one of the heads, a cross feed slide supporting and guiding the upper slide for reciprocation thereon, a main slide supporting and guiding the cross feed slide and adapted for advancing and retreating movement to bring the work and the wheel into and out of operative proximity, and means for constantly reciprocating the upper slide on the cross slide in the same line of direction as the advance and retreat of the main slide but at greater speed.

14. In a machine of the character indicated, a work head for supporting a work piece, a tool head having a machining tool to engage the work piece, a work contacting feeler to control the size of the work, means for bringing the work and the tool into machining contact, and means brought into operation after an interval of machining for moving the feeler into contact with the work.

15. In a machine of the character indicated, a work head for supporting a work piece, a tool head having a machining tool to engage the work piece, a work contacting feeler to control the size of the work, means for urging the feeler towards the work, and dash pot mechanism for delaying contact of the feeler with the work until the work has been partially machined.

16. In a machine of the character indicated, a work head for supporting a work piece, a tool head having a machining tool to engage the work piece, a work contacting feeler to control the size of the work, a solenoid for moving the feeler freely in one direction, and a dash pot for retarding movement of the feeler in the opposite direction.

17. In a machine of the character indicated, a work head for supporting a work piece, a tool head having a machining tool to engage the work piece, a work contacting feeler to control the size of the work, dash pot mechanism for retarding movement of the feeler towards the work until the work is partially machined, and means controlled by said feeler when the work reaches size for retracting the feeler from the work.

18. In a grinding machine, a work head having means to support a hollow work piece for rotation, a grinding wheel, a work sizing feeler to control the size of the work, means for moving the feeler into the interior of the work without contact therewith during the initial stages of grinding and for thereafter moving the feeler into contact with the work, means for retracting the feeler from contact with the work at a predetermined size, and means operable after an interval for moving the feeler outside of the work.

19. In a grinding machine, a work head comprising a pair of rotatable members forming a seat to locate and rotatably support a round work piece, a wheel head, a slide supporting one of the heads and adapted to advance and retreat, a motor for actuating the slide, a safety switch mounted on the work head controlling the motor circuit, and work engaging means comprising an idler wheel movably mounted on the work head to approach said switch and said rotatable members and constructed and arranged to prevent operation of the switch if the work is not properly seated.

20. In a grinding machine, a work head, a wheel head, a slide supporting one of the heads and adapted to advance and retreat, a motor for actuating the slide, a pair of safety switches wired in parallel to control the motor circuit, work engaging means for operating one of the switches and a cam on the slide for operating the other switch.

21. In a grinding machine, a work head, a wheel head, a slide supporting one of the heads and adapted to advance and retreat, a motor for actuating the slide, a work contacting feeler to control the size of the work, a timer, means controlled by the feeler for starting the timer, a solenoid controlled by the feeler for removing the feeler from the work, and means controlled by the timer to cause retreat of the slide.

22. In a grinding machine, a work head, a wheel head, cross feed mechanism for one of the heads, a slide supporting one of the heads and adapted to advance and retreat, a motor for actuating the slide, a work contacting feeler to control the size of the work, a timer, means controlled by the feeler for stopping the feed mechanism, means controlled by the feeler for removing the feeler from the work and starting the timer, and means controlled by the timer to cause retreat of the slide.

RAYMOND H. CRAMER.

CERTIFICATE OF CORRECTION.

Patent No. 2,330,809.                                          October 5, 1943.

RAYMOND H. CRAMER.

It is hereby certified that error appears in the printed specification of the above numbered patent requiring correction as follows: Page 1, first column, line 52, after the word and period "mechanism." insert the following -

Figure 11A:
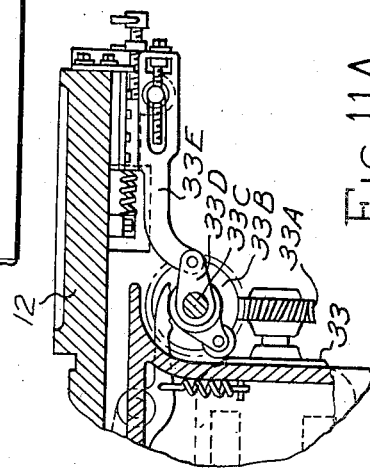

--Fig. 11A is a sectional view showing the reversible motor and driving connections for reciprocating the main slide.--;

and second column, line 33, after "Patent 2,149,409." insert the following -

--The details of that reciprocating mechanism are immaterial for present purposes and it suffices to state that a reversible motor 33, as indicated in Fig. 11A, turns a spiral or worm gear 33A meshing with a worm gear 33B on a shaft 33C to which is secured a lever arm 33D connected by a link 33E to the main slide, the reversible motor turning the shaft in opposite directions alternately about 180 degrees to produce the reciprocation as in the patent.--;

page 3, second column, line 56, for "slots 280" read --slots 288--; page 8, first column, line 51, after "slide" strike out the comma; line 73, after "slide" insert a comma; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.